US005262328A

United States Patent [19]

Clarke et al.

[11] Patent Number: 5,262,328

[45] Date of Patent: Nov. 16, 1993

[54] COMPOSITION FOR THE CLARIFICATION OF SUGAR-BEARING JUICES AND RELATED PRODUCTS

[75] Inventors: Stephen J. Clarke, Baton Rouge; Joy Bourgeois, Napoleonville, both of La.

[73] Assignee: Louisiana State University Board of Supervisors, Baton Rouge, La.

[21] Appl. No.: 815,769

[22] Filed: Jan. 2, 1992

Related U.S. Application Data

[62] Division of Ser. No. 642,438, Jan. 17, 1991, Pat. No. 5,110,363.

[51] Int. Cl.[5] .......................... G01N 31/00; C13D 3/02

[52] U.S. Cl. .......................... 436/17; 436/175; 127/46.1; 127/48; 127/50; 106/210; 210/716; 210/727; 252/182.11

[58] Field of Search .................. 436/17, 175; 127/46.1, 127/48, 50, 53; 106/210; 210/727, 716; 252/175, 181, 182.11

[56] References Cited

U.S. PATENT DOCUMENTS 3,806,364 4/1974 Gasco .................................. 127/48

4,415,467 11/1983 Piepho .................................. 252/87 X

OTHER PUBLICATIONS

The Merck Index, p. 232, 1983.

The Merck Index, 10th edition, 1983, p. 51.

*Primary Examiner*—James C. Housel

*Assistant Examiner*—Maureen M. Wallenhorst

*Attorney, Agent, or Firm*—Llewellyn A. Proctor

[57] ABSTRACT

A non-toxic composition, and method, for the clarification of raw sugar-containing juices, especially sugar cane juice, and related products, for analysis. A composition constituted of A) aluminum chloride hydroxide, B) lime and C) activated bentonite, bentonite containing calcium aluminum silicate, and preferably also a polymeric flocculating agent, has been found highly effective as a reagent for the clarification of sugar-containing juices, notably sugar cane juice, and related products.

6 Claims, No Drawings

COMPOSITION FOR THE CLARIFICATION OF SUGAR-BEARING JUICES AND RELATED PRODUCTS

This is a division of application Ser. No. 642,438, filed Jan. 17, 1991 now U.S. Pat. No. 5,110,363 issued May 5, 1992.

1. FIELD OF THE INVENTION

This invention relates to a composition, and method, for the clarification and treatment of sugar-bearing juices, particularly sugar cane juices, and related products. In particular, it relates to a composition, and method, for the clarification of raw sugar-bearing juices, notably sugar cane juices, for analysis of the sucrose content of the juices.

2. BACKGROUND

The production of raw sugar-bearing juices, i.e. sugar, or sucrose, requires, e.g. milling a cane for recovery of a sugar-containing juice. The plant cells of the cane are ruptured by pressure to release the sugar-bearing juice. The "raw juice" is turbid and dirty, greenish in color, and acidic. The nonsucrose solids in the juice consist of reducing sugars, mineral matter, of which potash is the largest constituent; and organic nonsugars, such as nitrogenous bodies, fats, waxes, and pectins or gums. The amounts of the nonsucrose impurities vary with the variety of cane, the growth period, soil conditions, climate and intensity of milling.

Analysis of a raw juice for determination of its sucrose content, e.g. as by use of a polarimeter, or saccharimeter, requires purification, or clarification of the juice. Lead acetate and other lead salts have served as clarifying agents for many, many years. Addition of these reagents to the juice, or solution of the juice, neutralizes the organic acids that are present. Salts, together with coagulated albumin and some fats, waxes and gums form a feathery precipitate that entraps finely suspended matter and parts of the colloids. Filtration produces a clear juice of about neutral pH which contains the sucrose. The percent sucrose of the solution can be obtained from the polarimeter, or saccharimeter reading, when the cane juice, or related product, is clarified to the point of optical clarity.

Lead subacetate has long been the reagent of choice for sugar cane juice clarification for such analyses, due largely to its simplicity of application. However due to its high toxicity, health and environmental circumstances require that lead residues of this type must now be disposed of in a safe manner. The cost of safely disposing of lead residues however is quite costly for which reason there exists a clear present need for a replacement for this material as an agent for clarifying raw sugar-bearing juices, e.g. raw sugar cane juices, and related products, for chemical analysis.

3. OBJECTS

It is, accordingly, an object of this invention to supply this need.

In particular, it is an object to provide a novel agent for the clarification of raw sugar-bearing juices, especially raw sugar cane juice, and related products, for chemical analysis.

A further object is to provide a novel stable and non-hygroscopic dry powdered composition which can be added to raw sugar cane juice, and related products, and mixed, and filtered to produce a non-toxic precipitate which can be readily disposed of without high cost, and an optically clear filtrate with low color for analysis.

4. SUMMARY OF THE INVENTION

These objects and others are achieved in accordance with this invention, which embodies:

As a composition of matter, an admixture of

A) Aluminum chloride hydroxide, a compound having the empirical formula $Al_2Cl(OH)_5$ [C. A. Registry #12042-91-0], B) Lime, $Ca(OH)_2$ or CaO, and C) Activated bentonite, bentonite containing calcium aluminum silicate for pozzolonic reaction with the lime, supra, to encapsulate any contaminants absorbed by the activated bentonite, and preferably also a polymeri flocculating agent.

DESCRIPTION OF THE PREFERRED EMBODIMENTS

The novel agent, or composition for the clarification of sugar-bearing juices, is formed by mixing components A, B and C. Components A and B are admixed, one with the other in concentrations sufficient, when added to a crude or raw sugar-bearing juice, especially a raw sugar cane juice, or related product, to neutralize, or essentially neutralize, its acidic character. In other words, the aluminum chloride hydroxide and the lime are admixed together in proportions adequate to neutralize one another, and as well the raw cane juice to which the admixture is added. Component C, in a dry form, is added to the mixture of A and B. Suitable, after admixture of Components A and B to the raw cane juice, or related product, the pH of the solution will range from about 6 to about 8, and preferably will approximate 7. The effect of Component C on pH is minimal. At or near the point of neutralization, after addition of the novel agents to a sugar-bearing juice, a $Ca(OH)_2$ precipitate will be formed.

In forming the novel agent, as suggested, Components A, B and C are premixed one with the other. The ratio of the two components of the mixture, A and B, is substantially fixed due to the pH requirements of the sugar-bearing juice to which the agent is added. Thus, Components A and B are added together in relative amount, one with respect to the other, such that when the agent is added to a sugar-bearing juice, the pH of the solution will range from about 6 to about 8, and preferably will approximate 7, as a consequence of adding these two components, supra. Generally, the weight ratio of A:B will approximate 10:1; variation in the relative amounts of A and B, respectively, being permissible within the pH requirements of the system to which the agent is added. The effect of Component C, which includes activated bentonite, and the bentonite containing calcium aluminum silicate, and preferably also the polymeric flocculating agent, on pH is minimal. Component C can vary to some extent in the mixture relative to Components A and B; Component C being added to the mixture in amounts ranging generally from about 2 to about 5 parts by weight, preferably about 2 parts by weight per 10 parts by weight of Component A (or per 1 part by weight of Component B). Thus, in general the weight ratio of A:B:C in a mixture preferably ranges from about 10:1:2-5, more preferably from about 10:1:2. In forming Component C per se the activated bentonite, bentonite containing the calcium aluminum silicate, and polymeric flocculating agent are added together in weight ratio of about 100:50:1-5, preferably about 100:50:2.

Compositions of this character provide an ideal reagent for the replacement of dry lead subacetate for the analysis of sugar-bearing juices, notably cane juices, or related products. This composition, added to a sugar-bearing juice, notably a raw cane juice, or related product: (i) forms a stable and non-hygroscopic dry powder which can be added without weighing, with the result independent of the quantity used; (ii) reacts quickly and very completely by merely shaking or stirring; (iii) forms a solution which can be filtered to provide an optically clear solution with low color; and (iv) forms a solution from which can be separated, suitably by filtration, a non-toxic precipitate which can be disposed of without creating waste disposal problems. The composition can be prepared by admixing together as dry powders all of Components A, B and C. The admixture can be prepared in only a few minutes, and is best prepared for use on a daily basis. However, the admixture when stored will lose very little activity over a period of several days even when kept in an open container. Consequently, when reagent is left over from a previous preparation it can be combined with the following day's fresh material. For raw cane juice, or press juice analysis, e.g. between 5 and 6 grams of the reagent is required for 200 milliliters of the juice. Less reagent is used for low concentration samples of most related products, e.g. filter cake and bagasse analyses and for mill residual juice. Generally, no filter aid is required and the filter paper and polarimeters employed in conducting such analyses are conventional. The rate of filtration in using these compositions is higher than with the conventionally used lead reagent. The clarity of the clarified products is very good; though often slightly more yellow. No problems are incurred in clarifying juices from stale cane.

The following non-limiting examples, and comparative data, further illustrate the compositions of this invention, and their use in a method for the clarification of sugar-bearing juices, suitably a raw cane juice, or related product. All parts are given in terms of weight units except as otherwise expressed.

EXAMPLES

Specimens comprising a variety of sugar-bearing juices containing sucrose in varying concentrations were each clarified, first with a conventional dry lead subacetate powder and then, secondly, with a composition of this invention, to provide optically clear solutions the sugar contents of which were read on a polarimeter and the results obtained between the use of the two different clarifying reagents compared. The compositions of this invention, hereinafter "ABC" reagent, was constituted of a mixture of (A) powdered aluminum chloride hydroxide [CAS: 12042-91-0 with empirical formula $Al_2Cl(OH)_5$], (B) powdered calcium hydroxide, and (C) powdered RM10-NKT, a trademark product of American Colloid Company, composed of minerals, principally bentonite, and polymeric flocculants. The A, B and C components used to form the ABC reagent were mixed on the day of the tests in ratio of 10:1:2.

In clarifying the sugar-bearing juices, generally from about 2 to 3 grams of the lead subacetate, and from about 5 to 6 grams of the ABC reagent, respectively, were added to a flask containing 100 ml of a sugar-bearing juice. These concentrations of reagent were found adequate to produce a specimen of optical clarity sufficient that the sucrose content of a juice could be read on a polarimeter.

The specimens of juice, after addition of a clarifying agent, and shaking, was filtered without use of a filter aid through a paper filter to produce optically clear solutions.

Each specimen of a given sugar-bearing juice was divided into two similar portions, a first which was treated with lead subacetate and clarified to produce an optically clear solution, and a second which was treated with the ABC reagent to produce an optically clear solution. The pairs of optically clear solutions were each then analyzed on a polarimeter, and the results compared by graphically plotting the polarimeter readings obtained by clarifying a specimen with lead subacetate on the "x" axis, and those obtained by clarifying a specimen with the ABC reagent on the "y" axis.

1) A large number of polarimeter readings made of clarified press juices obtained from crushed sugar cane grown near Jeanerette, La., analyzing between 50 percent and 80 percent sucrose, resulted in a locus of points which formed a straight line projected upwardly at a 45° angle from the point of intersection of the x and y-axis.
2) A graph similar to that described in "1" was developed from polarimeter readings of juices containing between 2 percent and 60 percent sucrose, extracted from filter cake, bagasse, mill juices and juices extracted from a filtrate.
3) Results similar to those described in "1" were also obtained in tests conducted with the following sugar-bearing juices, to wit:
   a) U.S. Sugar Corporation's, USSC, juices: sugar-bearing juices extracted from cane grown in Florida;
   b) Hawaiian Sugar Planters Association's, HSPA, syrup: sugar-bearing juices extracted from cane grown in Hawaii; and
   low sucrose content juices, juices containing sucrose in concentrations of 7 pecent to 12 percent, obtained by pressing the juice from a filtrate.

In short, these data showed that the ABC reagent was as effective as the known commercial lead subacetate in clarifying a wide variety of sugar-bearing juices. In other words, the ABC reagent proves a suitable replacement for lead subacetate, and it is superior thereto in that it does not impose the health and environmental debits associated with the commercial standard bearer.

The activated bentonite of Component C is bentonite activated by any one of several known methods, notably one of the "wet methods" wherein the activators are introduced by dispersing or dissolving same in a solution which is then contacted with the bentonite. For example, sodium carbonate, or other activator, according to a first of such methods, as described in U.S. Pat. No. 4,415,467, is introduced into the raw bentonite in an amount of from several up to 22.5 percent by weight in relation to the mass of the bentonite up to the flowability point. According to a second of these methods, a solution of activator is introduced into the raw bentonite in an amount of from 22.5 percent by weight in relation to the mass of the bentonite up to the flowability point of the bentonite. Accordingly to a third method, a solution of the activator is introduced into the raw bentonite in an amount giving a mixture with a flowability point about that of the bentonite.

With respect to the flowability point, this means that an amount of the solution is employed which, when added to the bentonite and mixed with it, changes the mixture from the solid state to fluid state. The flowability point is different for various types of bentonites and depends upon their respective percentage contents of minerals belonging to the montmorillonite groups.

To activate the raw bentonite material, a suitable amount of the activator solution is introduced into the bentonite and the material then is dried, sometimes with mixing and turning to accelerate the drying process.

One modification of this method is an activation based on bringing the whole mass of bentonite material to a state above the flowability point by the addition of an activator with the aid of different kinds of mixers, after which a suitable coagulant, making possible the passing of the whole mixture through a filter press, is introduced.

In accordance with U.S. Pat. No. 3,240,616, the bentonite can be activated without mixing and the amount of activator is correlated with the montmorillonite content of the bentonite to increase the strength of the bentonite. The time of activation can vary from one to up to about one hundred hours.

Acid activation generally is carried out by mixing bentonite clay with water to form a suspension. A mineral acid such as hydrochloric or sulfuric, is added to the suspension and the mixture is heated to about 100° C. for several hours. The heated mixture then is diluted with cold water and washed, for example in a filter press to remove excess acid almost completely. The activated bentonite is dried to a convenient moisture content, for example 8% to 15% by weight and then pulverized to a suitable size. The acid treatment eliminates alkalies and calcium and reduces the content of magnesium, iron and aluminum. The B.E.T. surface area of activated bentonites is on the order of 240–300M$^2$/gram and the adsorption capacity is greatly increased by activation. The acid treatment alters the pore size distribution by removing Al, Mg and Fe from the octahedral bentonite layer and replaces the exchangeable ions with hydrogen and aluminum. In addition, a dissolution process takes place which varies in extent according to the concentration of the acid, the temperature, the pressure and the time. As a result, the crystalline structure of the montmorillonite is modified by the dissolution of Al-, Fe- and Mg-ions, and the specific surface as well as the porosity is increased. The morphological change which occurs after treatment with hydrochloric acid (840 milliequivalents per 100 g bentonite) as opposed to the appearance of untreated natural bentonite is readily apparent.

An acid treatment of bentonite results in the replacement of the substitutable cations by H-ions as well as a partial dissolution of the Al, Fe- and Mg-ions in the silicate lamella of the montmorillonite from around the edges. This leaves voluminous deposits of silicic acid which most probably results in wedge-shaped bursting action causing a loosening of the crystal texture and a disorientation of the silicate layer. Thus, as a result of the voluminous incidence of silicic acid together with the separation of hydrogen-montmorillonite-silicate-lamella out of the crystal lattice, the specific surface is greatly enlarged and the adsorption capacity greatly increased.

Bentonite also can be activated by alkalies. The alkaline activation of bentonite is based mainly on an ionic exchange reaction, in which the earthy base ions of the montmorillonite are replaced by alkali ions. These ions are located on the edges and surfaces of the scale-like montmorillonite crystals. So that the exchange takes place as completely as possible, water should be present in an alkaline activation in order to dissolve the alkali ions. Furthermore, the reaction can be accelerated to more rapid surface enlargement through shearing forces and by lowering the water viscosity and an increase in the ion diffusion rate through temperature.

Through ion exchange the already thin montmorillonite crystals are fractured into may even thinner silicate lamella. In comparison with the relative compact crystals found in the presence of earthy base ions which permit only a limited swelling in water, for sodium montmorillonite individual silicate layers can flake off of the crystal.

The alkaline activation, based on the quantity of water involved, results in the familiar high plasticity or viscosity and the thixotropy of the more highly swelling active bentonite.

For commercial, large scale industrial production of activated bentonite, the activation, i.e., the conversion of an earthy base bentonite with low swelling properties into an alkali (sodium) bentonite with high swelling ability, is usually conducted with soda, since soda is the most efficient and economical activator. Suitable alkali activating chemicals include sodium phosphate, sodium oxalate, sodium carbonate and possibly sodium sulfate or other sodium compounds, which react with substitutable earthy base ions of the montmorillonite. Other known ion exchange reactions, for example with ion exchangers or with concentrated sodium salt solutions, are not normally used to produce activated bentonite on a larger scale because they are difficult to work with and uneconomical.

Activation reactions can be expressed schematically as follows:

| | | | |
|---|---|---|---|
| | + Na-Carbonate | | + Ca-Carbonate |
| Ca-Montmorillonite | + Na-Phosphate = | Na-Montmorillonite | + Ca-Phosphate |
| | + Na-Oxalate | | + Ca-Oxalate |
| | + Na-Sulfate | | + Ca-Sulfate |

Each of these ion exchange reactions not only produces sodium montmorillonite, but also in every case a calcium compound which is not readily soluble in water.

Further, bentonite, particularly those which already have naturally occurring substitutable bound alkali ions, can be activated by treatment with magnesium salts, i.e. magnesium sulfate, or magnesium salts in combination with alkali salts, as disclosed in German patent specification No. 1,081,346. Bentonite activated in any manner is useful as the activated bentonite in accordance with te present invention. A particularly useful activated bentonite Tixoton is acid activated and contains approximately, by weight: $SiO_2$: 56.7%; $Al_2O_3$: 20.2%; CaO: 2.4%; MgO: 4.3%; $Na_2O+K_2O$: 2.7%.

Bentonite containing calcium aluminum silicate for pozzolonic reaction with lime is employed in an amount of at least about 30 percent, based on the dry weight of the activated bentonite component to provide sufficient reaction for encapsulation of the activated bentonite after adsorption of contaminants. While there is no upper limit to the amount of calcium bentonite, amounts greater than about 100%, based on the dry weight of activated bentonite, will be wasted since generally 30% to 50% calcium bentonite by dry weight of activated bentonite is sufficient to completely encapsulate the contaminants within the activated bentonite.

Lime in the form of CaO or $Ca(OH)_2$ is included in an amount sufficient for pozzolonic reaction with the bentonite containing calcium aluminum silicate and, generally, the amount of lime should be at least 50% based on the dry weight of the bentonite containing calcium aluminum silicate up to about 75% based on the dry weight of the bentonite containing calcium aluminum silicate to achieve sufficient pozzolonic reaction for encapsulation of the activated bentonite. Lime in amounts greater than about 75% based on the dry weight of bentonite containing calcium aluminum silicate can be used but results in wasted lime with no apparent advantage.

The polymeric flocculating component, which is preferred, is added to the raw sugar-bearing juice, e.g. cane sugar, or related product, after encapsulation of the activated bentonite containing adsorbed contaminants, can be any flocculating agent useful in flocculating the contaminants in the particular raw sugar-bearing juice, or related product, being treated. Particularly useful flocculants are the polymeric organic cationic or non-ionic flocculants such as polyethyleneamine having a molecular weight of at least 25,000; poly-4-vinyl-N-butylpyridonium bromide having a molecular weight of at least 25,000; and polyacrylamide having molecular weight at least one million, and preferably in the range of 1 to 5 million. For a typical raw cane juice, or related product, the flocculating agent is added in an amount of at least 5 grams of flocculating agent per cubic meter of liquid to achieve sufficient flocculation of the encapsulated activated bentonite so that the activated bentonite and adsorbed contaminants may be easily removed, such as by filtration or the like. When the flocculating agent is included in the chemical composition of the present invention, generally it is included in an amount of flocculating agent in the range of 0.05-5.0% based on the weight of activated bentonite to flocculate all of the activated bentonite for later separation from the waste water. Accordingly, the flocculating agent generally will form about 0.1 to 2% based on the total weight of the composition of the present invention.

The composition, on addition to the raw cane juice, or related product, will react very quickly by merely shaking or stirring to form a feathery or gelatinous precipitate which is readily separated from the sugar-containing solution by conventional means, suitably by filtration. Filtration will produce an optically clear solution with low color which can be directly read on a polarimeter to determine percent sucrose. The composition can be used as a direct replacement of substitute for lead subacetate as a clarifying agent, and it can be used in essentially the same manner.

It is apparent that this invention, either the composition or method, is subject to some variation without departing the spirit and scope of the invention.

Having described the invention, what is claimed is:

1. A composition for the clarification of a raw sugar-bearing juice by the addition to said juice of an amount to form a precipitate, without dilution of said raw sugar-bearing juice, and separation from the precipitate of a clarified juice suitable for the direct analysis of the original sugar content thereof, which comprises a dry, stable powdered admixture of A) aluminum chloride hydroxide, B) lime, and C) activated bentonite, the bentonite containing calcium aluminum silicate, the proportions of A and B, one with respect to the other, being sufficient that when the composition is added to the sugar-bearing juice, the pH will be in the range of from about 6 to about 8.

2. The composition of claim 1 wherein the composition further contains, as a component of "C", a polymeric flocculating agent.

3. The composition of claim 2 wherein the polymeric flocculating agent is polyacrylamide.

4. The composition of claim 1 wherein the proportions of A and B of the composition changes the pH of the treated juice to substantially neutral.

5. The composition of claim 1 wherein the weight ratio of A:B:C in the composition is about 10:1:2-5.

6. The composition of claim 5 wherein the weight ratio of A:B:C in the composition is about 10:1:2.

* * * * *